United States Patent
Thomas et al.

(10) Patent No.: US 9,632,891 B2
(45) Date of Patent: Apr. 25, 2017

(54) FASTER RECONSTRUCTION OF SEGMENTS USING A DEDICATED SPARE MEMORY UNIT

(71) Applicant: NETAPP, INC., Sunnyvale, CA (US)

(72) Inventors: Arvind Thomas, Bangalore (IN); Premnath Bysani, Bangalore (IN)

(73) Assignee: NETAPP, INC., Sunnyvale, CA (US)

( * ) Notice: Subject to any disclaimer, the term of this patent is extended or adjusted under 35 U.S.C. 154(b) by 97 days.

(21) Appl. No.: 14/620,650

(22) Filed: Feb. 12, 2015

(65) Prior Publication Data
US 2016/0239397 A1  Aug. 18, 2016

(51) Int. Cl.
G06F 11/00 (2006.01)
G06F 11/20 (2006.01)
G06F 3/06 (2006.01)
G06F 11/10 (2006.01)

(52) U.S. Cl.
CPC ........ *G06F 11/2094* (2013.01); *G06F 3/0619* (2013.01); *G06F 3/0647* (2013.01); *G06F 3/0689* (2013.01); *G06F 11/1076* (2013.01); *G06F 2201/805* (2013.01)

(58) Field of Classification Search
CPC .... G06F 3/0619; G06F 3/0647; G06F 3/0689; G06F 11/1088; G06F 11/1092; G06F 11/2094; G06F 2201/805
See application file for complete search history.

(56) References Cited

U.S. PATENT DOCUMENTS

| | | | | |
|---|---|---|---|---|
| 7,647,526 | B1* | 1/2010 | Taylor | G06F 11/1092 714/6.32 |
| 2007/0088990 | A1* | 4/2007 | Schmitz | G11B 20/20 714/700 |
| 2010/0251012 | A1* | 9/2010 | Zwisler | G06F 11/2094 714/6.32 |
| 2014/0304547 | A1* | 10/2014 | Sugawara | G06F 11/1076 714/6.22 |
| 2015/0012775 | A1* | 1/2015 | Cudak | G06F 3/0619 714/6.22 |
| 2016/0188424 | A1* | 6/2016 | Walls | G06F 11/1662 714/6.3 |

* cited by examiner

*Primary Examiner* — Joshua P Lottich
(74) *Attorney, Agent, or Firm* — Cooper Legal Group, LLC

(57) ABSTRACT

Techniques for faster reconstruction of segments using a dedicated spare memory unit are described. Zone segments in memory units are associated with a dedicated spare memory unit. The zone segments are reconstructed in the dedicated spare memory unit in response to a failed memory unit except for an identified failed zone segment of the failed memory unit. The identified failed zone segment of the failed memory unit is retained in the dedicated spare unit. Other embodiments are described and claimed.

20 Claims, 13 Drawing Sheets

FASTER RECONSTRUCTION OF SEGMENTS USING A DEDICATED SPARE MEMORY UNIT

BACKGROUND

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue to increase in the foreseeable future. Moreover, data, data files, and/or data records are also required to be stored, retained, and/or saved for various periods of time for subsequent retrieval and/or use. Efficiently storing, preserving, and preventing a loss of the data, data files, and/or data records data are important design considerations, and therefore, a need exists to improve data storage utilization and preservation techniques for increased reconstruction of data segments to an optimal state.

DETAILED DESCRIPTION

Figure 1:
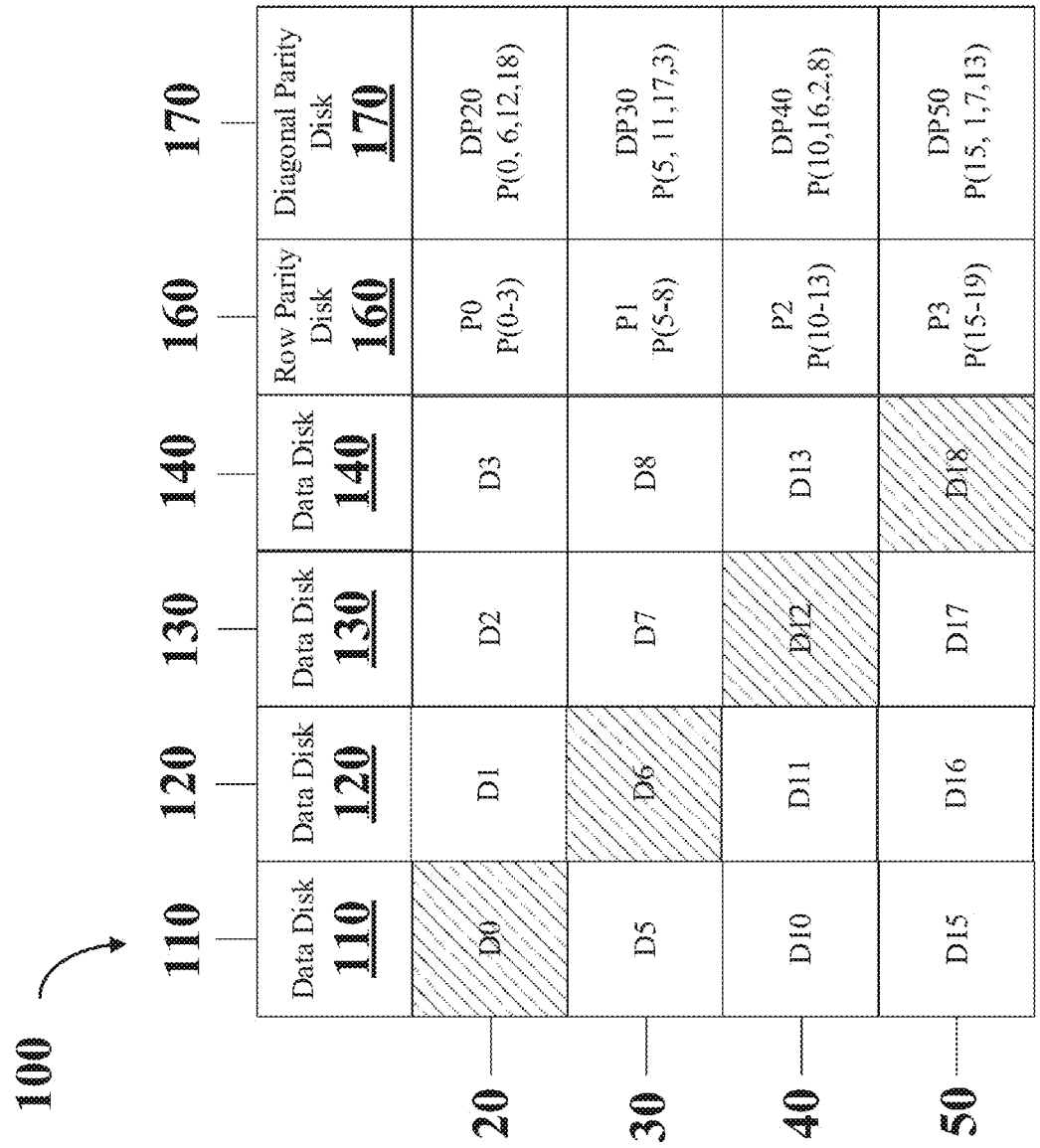
FIG. 1 illustrates a block diagram of an arrangement of data blocks on disks according to RAID-Double Parity (DP) in accordance with one embodiment.

A storage server is a computer system and a form of storage controller that is used to store and retrieve data on behalf of one or more client devices (or "clients") on a network. A storage server operates on behalf of one or more clients to store and manage data in a set of mass storage devices, such as flash memory, magnetic or optical storage-based disks or tapes. A storage server may be configured to service file-level requests from clients, as in the case of file servers used in a Network Attached Storage (NAS) environment. Alternatively, a storage server may be configured to service block-level requests from clients, as done by storage servers used in a Storage Area Network (SAN) environment. Further, some storage servers are capable of servicing both file-level and block-level requests, as done by certain storage servers made by NetApp®, Inc. of Sunnyvale, Calif.

Hard disk drives ("disks") are common data storage devices used in conjunction with computers. Computers store data either on locally attached disks or on a remote data storage server computer, which includes locally attached disks. Disks, like other electronic devices, are prone to occasional failures, which can result in a loss of access to the data on the disk. A technique for protecting data against the failure of a disk is to provide some form of redundancy, such as combining several disks into a Redundant Array of Inexpensive (or Independent) Disks (RAID).

RAID levels define a relationship between data and disks. A collection of disks, which implement a RAID level, is referred to as a RAID array. Different RAID levels may involve mirroring data between disks, striping data across disks, or striping data and parity information across disks. RAID arrays of RAID levels 3, 4 and 5 involve striping data across all of the disks of the array, which may contain many thousands of equally sized stripes, and also involves storing parity information in the array. Each disk contributes the same amount of storage space for a particular stripe, referred to as a block. The size of a block, or block size, is constant throughout a RAID array and is usually defined when the RAID array is created. Thus, a stripe has a total storage space of the block size times the difference between the number of disks in the RAID array and the number of parity blocks per stripe. One or more blocks of each stripe are reserved for storing parity information. Parity information is mathematically derived from the data in other blocks of the stripe, such as by performing a logical "exclusive or" (XOR) operation on the data within the stripe.

Thus, in the event of a disk failure, data may be recreated from any particular block on a disk that failed by performing an XOR operation on the data and parity information in the remaining blocks of the stripe to recreate the lost data. The recreated data is then typically stored to a spare disk associated with the RAID array. Thus, data from a failed disk may be recreated on the spare disk to maintain the fully functional RAID array. However, this operation typically increases stress on an XOR engine.

Various embodiments described herein provide various enhanced data storage techniques, such as one or more techniques to enhance performance of a memory unit group. Some embodiments may enhance performance of a memory unit group in a physical and/or virtual RAID array. In one embodiment, for example, certain memory unit group improvement techniques may be implemented in a storage system to significantly reduce or eliminate stress on a parity engine (e.g., an XOR engine) for a memory unit group array, such as, for example, a RAID array.

Various embodiments are generally directed to increased efficiency of reconstruction of memory unit segments using a dedicated spare memory unit. Some embodiments are particularly directed to creating zone segments in each memory unit assigned to a memory unit group. In one embodiment, the memory unit group is a physical and/or virtual redundant array of inexpensive disks (RAID) group. The total number of zone segments in the memory unit is based on the total number of memory units in the memory unit group. The zone segments are associated with a dedicated spare memory unit assigned to the memory unit group. In response to a failed memory unit, each one of the zone segments are reconstructed in the dedicated spare memory unit except for an identified failed zone segment of the failed memory unit.

Various embodiments for increasing the efficiency of reconstruction of zone segments in the dedicated spare memory unit include splitting the dedicated spare memory unit into the zone segments of the memory units in the memory unit group. The dedicated spare memory unit is assigned to the memory unit group from a pool of spare memory units. The zone segments from the memory units in the memory unit group are copied into a new dedicated spare memory unit when a new dedicated spare memory unit is first assigned or reassigned to the memory unit group. A mirror copy is performed and maintained in the dedicated spare memory unit for any write operation into one of the zone segments in any one of the memory units in the memory unit group. The total number of zone segments and the total number of memory units in the memory group are determined. The total number of the zone segments is determined and/or set equal to a total number of disks in the memory unit group. The total number of memory units in the memory unit group also includes any parity disks assigned to the memory unit group. The size of each of the zone segments are determined to be and/or set equal to the size of a memory unit in the memory unit group divided by the total number of memory unit in the memory unit group. In response to a detection or prediction of a memory unit failure, the dedicated spare memory unit is promoted to the failed memory unit, and the identified failed zone segment is retained and remains idle in the dedicated spare memory unit.

If a memory unit is predicted to fail, the dedicated spare memory unit may be promoted to the predicted failed memory unit. All previously copied zone segments included in the dedicated spare memory unit relating to zone segments in the predicted failed memory unit are retained in the dedicated spare memory unit. The remaining segments in the predicted failed memory unit are copied into the dedicated spare memory unit.

Thus, the various embodiments described herein, provide the benefit of reducing the stress on the XOR engine for the zone segment of the memory unit that requires no reconstruction following a memory unit failure. Also, if two (or more) memory units fail simultaneously, then the zone segments can be copied from the dedicated spare memory unit to the second memory unit, which will be from the global spare list, reducing the stress on the XOR engine. The zone segments may also be used for error correction in case of certain errors, such as irretrievable errors, for example.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation. Also, for example, each of the set of flow charts may be embodied together forming a single flow chart, or in the alternative, each of the flow charts may be executed by the systems and computer program products described herein.

FIG. 1 illustrates a block diagram of an arrangement of data blocks on disks in an array 100 according to a RAID-DP implementation. The disk array 100 includes at least four data disks 110, 120, 130, and 140 and two parity disks 160, 170. More specifically, the two row parity disks include row parity disk (RP) 160 and diagonal parity disk (DP) 170. Data disk 110 is arranged to include data storage blocks D0, D5, D10, and D15. Data disk 120 includes data storage blocks D1, D6, D11, and D16. Data disk 130 is arranged to include data storage blocks D2, D7, D12, and D17. Data disk 140 is arranged to include data storage blocks D3, D8, D13, and D18. Each of the data storage blocks D0-D18 may be variable or fixed-size. For example, in one embodiment, the fixed-size data blocks may be four kilobytes.

As shown in FIG. 1, data sent to a storage system 220 (see FIG. 2) from a client(s) for storage as part of a write operation may first be divided up into the data blocks D0 to D18. The data storage blocks D0-18 are grouped into stripes 20, 30, 40, and 50, which are spread across disks 110, 120, 130, and 140 of the array 100. For example, stripe 20 includes data storage blocks D0-D3, row parity block P0, and parity protection blocks DP20. Stripe 30 includes data storage blocks D5-D8, row parity block P1, and parity protection blocks DP30. Stripe 40 includes data storage blocks D10-D13, row parity block P2, and parity protection blocks DP40. Stripe 50 includes data storage blocks D15-D18, row parity block P3, and parity protection blocks DP50.

Row parity, which is an exclusive-OR (XOR) of the data in the stripes 20, 30, 40, and 50 is computed and may be stored in a row parity block (P0, P1, P2, and P3) on the row parity disk 160. Diagonal parity, which is an XOR of the data and row parity in staggered blocks within a diagonal stripe of the stripes 20, 30, 40, and 50, is computed and may be stored in parity protection blocks (DP20, DP30, DP40, and DP50) on the diagonal parity disk 170. For example, parity protection block DP20 of the diagonal parity disk 170 includes the diagonal stripe group of data storage blocks D0, D6, D12, and D18. By way of example only, and for more clearly illustrating a diagonal stripe, diagonal lines are included in the data storage blocks D0, D6, D12, and D18. Parity protection block DP30 includes the diagonal stripe group of data storage blocks D5, D11, D17, and D3. Parity protection block DP40 includes the diagonal stripe group of data storage blocks D10, D16, D2, and D8. Parity protection block DP50 includes the diagonal stripe group of data storage blocks D15, D1, D7, and D13.

In one embodiment, the location of the parity depends on the type of protection scheme or protocol implemented. For example, the row parity for P0, P1, P2, and P3 is stored in a first dedicated disk, referred to herein as the Row Parity Disk 160. The diagonal parity, such as for DP20, DP30, DP40 and DP40, is parity distributed across disks in the different stripes 20, 30, 40, and 50 with parity values stored in a second dedicated disk, referred to herein as the Diagonal Parity Disk 170.

Figure 2:
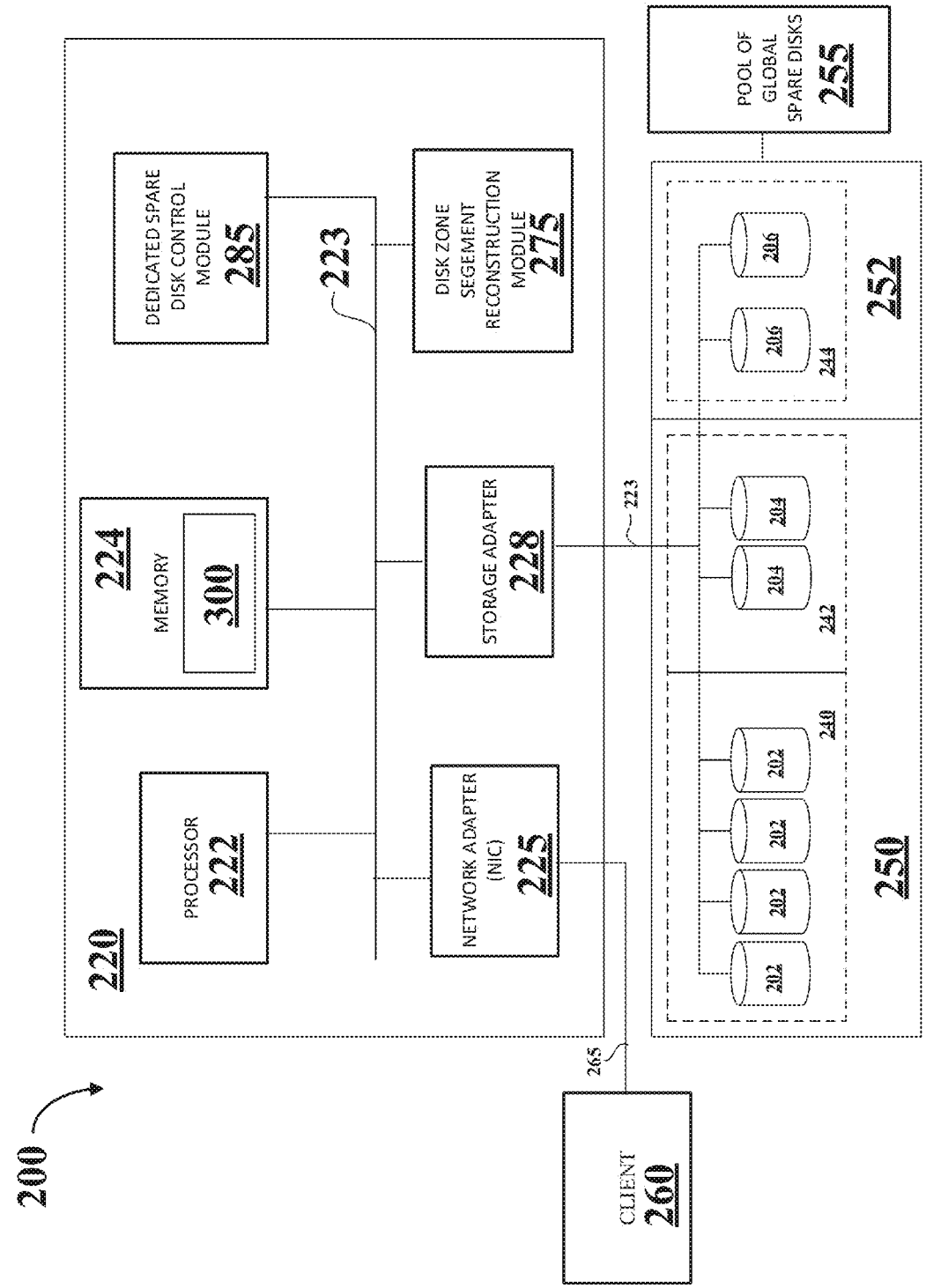
FIG. 2 illustrates block diagram of an environment including a storage system in accordance with one embodiment.

FIG. 2 is a block diagram of an illustrative embodiment of memory unit group optimization system 200 including a storage system 220. The storage system 220 is a computer that provides access to files stored on mass storage devices, such as disks 202, 204, 206 of a disk array 240, 242, 244. For example, disk array 240, 242, 244 may be a physical and/or a virtual RAID array. As used herein, the term disk may include any type of physical or virtual memory unit. It will be appreciated that the various embodiments are not so limited by the illustrative embodiment such that disks 202, 204, 206 may comprise any type of mass storage devices, including but not limited to magnetic disk drives, flash memory, and any other similar media adapted to store information, including data and parity information.

The storage system 220 includes a processor 222, a memory 224, a network adapter 225, a dedicated spare disk control module 285, a disk zone segment reconstruction module 275, and a storage adapter 228 interconnected by a system bus 223. The storage system 220 also includes a storage operating system 300 that implements storage system 220, to optimize the reconstruction process of a failed disk in disk array 240, 242, 244.

In the illustrative embodiment, memory 224 includes storage locations that are addressable by at least one processor 222. The processor 222 and the network adapter 225 and storage adapter 228 may be non-transitory computers and adapters for storing software program code and data structures associated with the various embodiments. The processor 222, the network adapter 225, and storage adapter 228 may, in turn, include processing elements and/or logic circuitry configured to execute the software code and manipulate the data structures. The storage operating system 300 may be resident in memory 224 and executed by the processor 222. The storage operating system 300 functionally organizes the storage system 220 by invoking storage operations in support of a file service implemented by the storage system 220. It will be apparent to those skilled in the art that other processing and memory means, including various computer readable media, may be used for storing and executing program instructions pertaining to the inventive techniques described herein.

The network adapter 225 includes the mechanical, electrical and signaling circuitry needed to connect the storage system 220 to a client 260 over a computer network 265, which may comprise a point-to-point connection or a shared medium, such as a local area network. The client 260 may be a general-purpose computer configured to execute applications. Moreover, the client 260 may interact with the storage system 220 in accordance with a client/server model of information delivery. That is, the client 260 may request the services of the storage system 220 acting as a server. The storage system 220 may return the results of the services requested by the client 260 by exchanging packets encapsulating a Common Internet File System (CIFS) protocol or Network File System (NFS) protocol format over the network 265.

The storage adapter 228 cooperates with the storage operating system 300 executing on the storage system 220 to access information requested by the client 260. The information may be stored on any type of attached array of writeable media such as magnetic disk drives, flash memory, and any other similar media adapted to store information. In the illustrative embodiment described herein, however, the information is preferably stored in disk blocks on the disks 202, 204, 206. The storage adapter 228 includes input/output (I/O) interface circuitry that couples to the disks over an I/O interconnect arrangement, such as a conventional high-performance, Fibre Channel serial link topology. The information is retrieved by the storage adapter 228 and processed by the processor 222 or the adapter 228 prior to being forwarded over the system bus 223 to the network adapter 225. The network adapter 225 formats the information into a packet and returns the packet to the client 260.

Storage of information on arrays 240, 242, 244 is preferably implemented as one or more storage "volumes" 250, 252 that comprise a cluster of disks 202, 204, 206 defining an overall logical arrangement of disk space. The disks 202, 204, 206 within a volume are typically organized as one or more physical and/or virtual Redundant Array of Independent (or Inexpensive) Disks (RAID) groups. The system bus 223 provides the storage system 220 access to the disks 202, 204, and 206. In one embodiment, to facilitate access to disks 202, 204, 206, the storage operating system 300 may implement a file system, such as a write anywhere file system, which logically organizes the information as a hierarchical structure of directories and files on the disks. Each file may be implemented as a set of disk blocks configured to store information. The directory may be implemented as a specially formatted file in which other files and directories are stored.

Also, a pool of global spare disks 255 is in communication with the process 222, the dedicated spare disk control module 285, and with the arrays 240, 242, 244 implemented as one or more storage "volumes" 250, 252 that comprise a cluster of disks 202, 204, 206 defining an overall logical arrangement of disk space.

Figure 3:
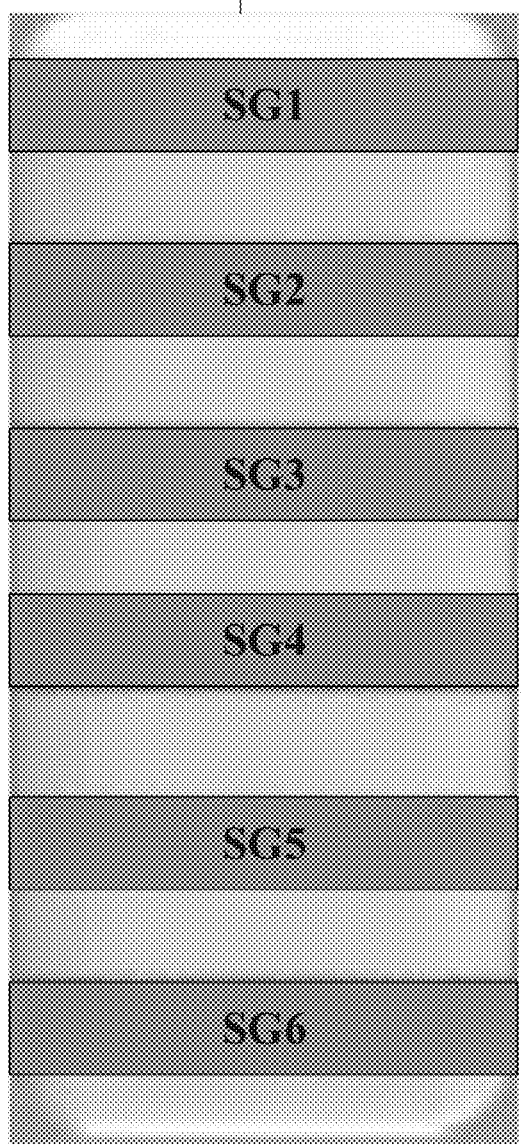
FIG. 3 illustrates a block diagram of a memory unit in a memory unit group separated into zone segments in a storage system in accordance with one embodiment.

FIG. 3 illustrates a block diagram of a disk 202 in a memory unit group separated into zone segments in a storage system in accordance with one embodiment. FIG. 3 illustrates disk 202 in FIG. 2 showing the zone segments (SG1-SG6) by way of example only, and FIG. 3 may also apply to disks 204 and 206 of a disk array 240, 242, 244. It will be appreciated that the various embodiments are not so limited by the illustrative embodiment such that disks 202, 204, 206 may comprise any type of mass storage devices, including but not limited to magnetic disk drives, flash memory, and any other similar media adapted to store information, including data and parity information.

In one embodiment, the storage system 220, or the dedicated spare disk control module 285, operated by the processor 222, splits the disks 202 into zone segments (SG1-SG6). The storage system 220 determines the total number of the zone segments to be equal to a total number of disks in the memory unit group, such as a RAID group. The total number of disks in the memory unit group includes any parity disks assigned to the memory unit group. For example, disk 202 is included in disk array 240, now shown in FIG. 4, to have at least six (6) disks D1, D2, D3, D4 and two (2) parity disks, which include row parity disk (RP) and diagonal parity disk (DP). The size of each of the zone segments (SG1-SG6) is the size of the disk 202 divided by the total number of disks in the memory unit group. For example, in FIG. 3, disk 202 is 60 gigabytes (GB). The maximum number of total disks D1, D2, D3, D4, RP, and DP in disk array 240 of FIG. 4 is six. Thus, the size of each zone segment SG1-SG6 in disk 202 is determined to be 10 GB.

Figure 4A:
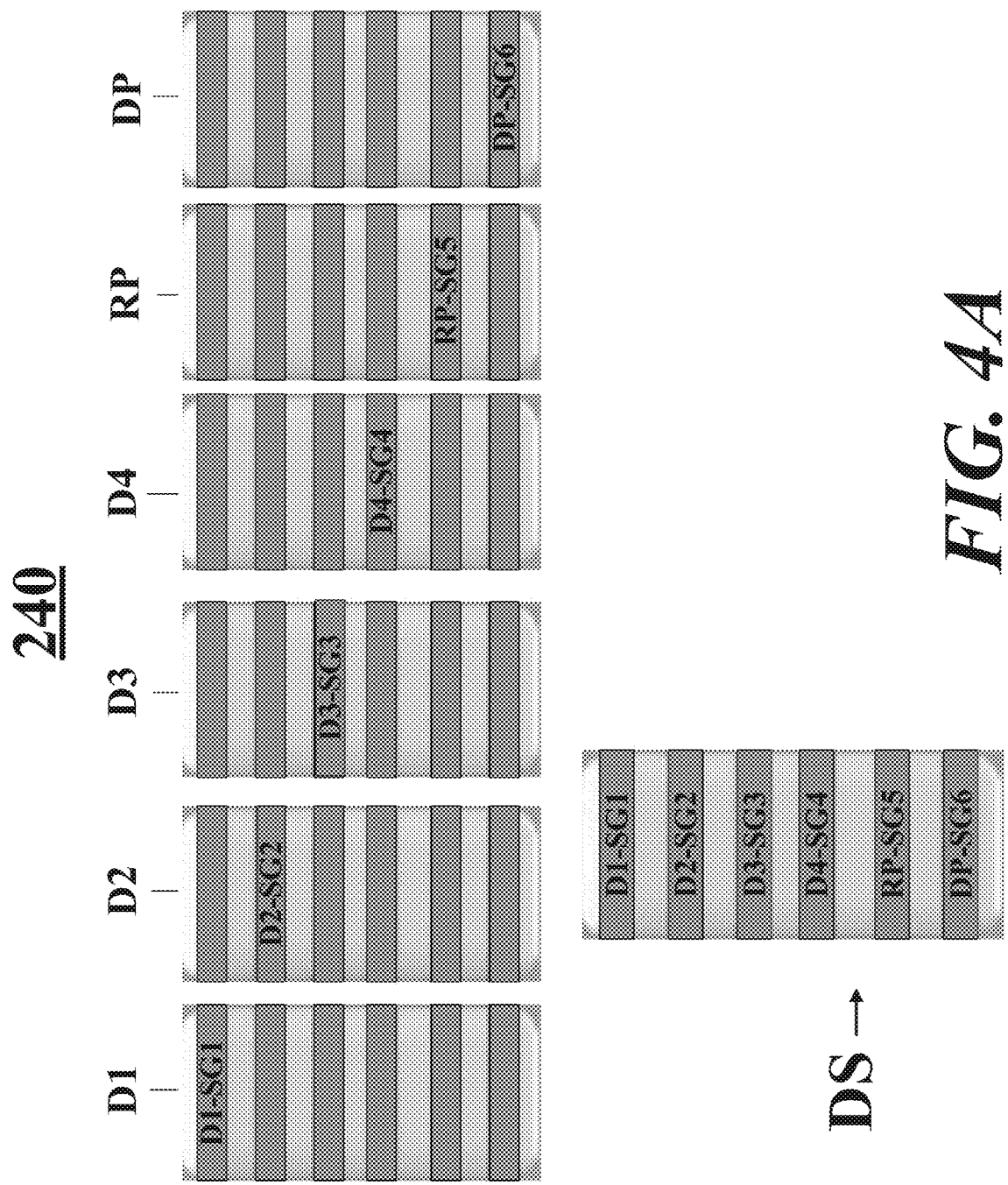
FIG. 4A illustrates a block diagram of a disk array with zone segments copied into a dedicated spare memory unit from a memory unit in a memory unit group in a storage system in accordance with one embodiment.

FIG. 4A illustrates a block diagram of a disk array 240 with zone segments copied into a dedicated spare memory units from memory units in a memory unit group in a storage system in accordance with one embodiment. As illustrated in FIG. 4, the storage system 220 creates zone segments for each of the disks in the disk array 240. For example, the storage system 220 may create zone segments D1-SG1, D2-SG2, D3-SG3, D4-SG4, RP-SG5, and DP-SG6 for each of the disks D1, D2, D3, D4, RP, and DP in the disk array 240. The dedicated spare disk control module 285 and the storage operating system 300, controlled by processor 222, also splits a dedicated spare disk (illustrated in FIG. 4 as "DS") into the zone segments (D1-SG1, D2-SG2, D3-SG3, D4-SG4, RP-SG5, and DP-SG6). For example, there are four disks D1, D2, D3, and D4 having 60 GB storage capacity for data storage. Also included in disk array 240 is row parity disk (RP) and diagonal parity disk (DP) protecting the disks D1, D2, D3, and D4. By way of example only, the maximum memory unit group size is 6, which includes memory units D1, D2, D3, D4, RP and DP. In the event of a disk failure disk the reconstruction time is 60 minutes.

The dedicated spare disk DS in FIG. 4 is dedicated as a spare for disk array 240 from the pool of global spare disks (FIG. 2 255). A mirror copy operation of each zone segment D1-SG1, D2-SG2, D3-SG3, D4-SG4, RP-SG5, and DP-SG6 is performed in the dedicated spared disk DS as data is written into the data disks D1, D2, D3, and D4 and parity disks RP, DP. In this way, the reconstruction time is reduced upon the occurrence of disk failure in the disk array 240. For example, the increased efficiency reconstruction time savings would be one sixth (⅙) of 60 minutes. In other words, there would be a savings of at least 10 minutes for the total reconstruction time. In this example, the disk array 240 now increases transition time from a degraded state to healthy state by 16 percent (%) since whenever disk D1, D2, D3, D4, RP, and/or DP in the disk array 240 fails, the corresponding zone segment D1-SG1, D2-SG2, D3-SG3, D4-SG4, RP-SG5, or DP-SG6 of the failed disk D1, D2, D3, D4, RP, or DP is identified in the dedicated spare DS. For example, if disk D1 fails, the zone segment D1-SG1 is identified as the corresponding zone segment in the dedicated spare disk DS. While the zone segment D1-SG1 is left alone and remains "as is" in the dedicated spare disk DS, the remaining zone segments D2-SG2, D3-SG3, D4-SG4, RP-SG5, and DP-SG6 are reconstructed in the dedicated spared disk DS. The disk zone segment reconstruction module 275 reconstructs the zone segments D2-SG2, D3-SG3, D4-SG4, RP-SG5, and DP-SG6. Hence, the time taken to reconstruct the zone segment DS-SG1 is saved. In response to the disk D1 failure the dedicated spare disk DS is promoted to the failed disk D1. The identified failed zone segment DS-SG1 is retained and remains idle in the dedicated spare disk DS.

Figure 4B:
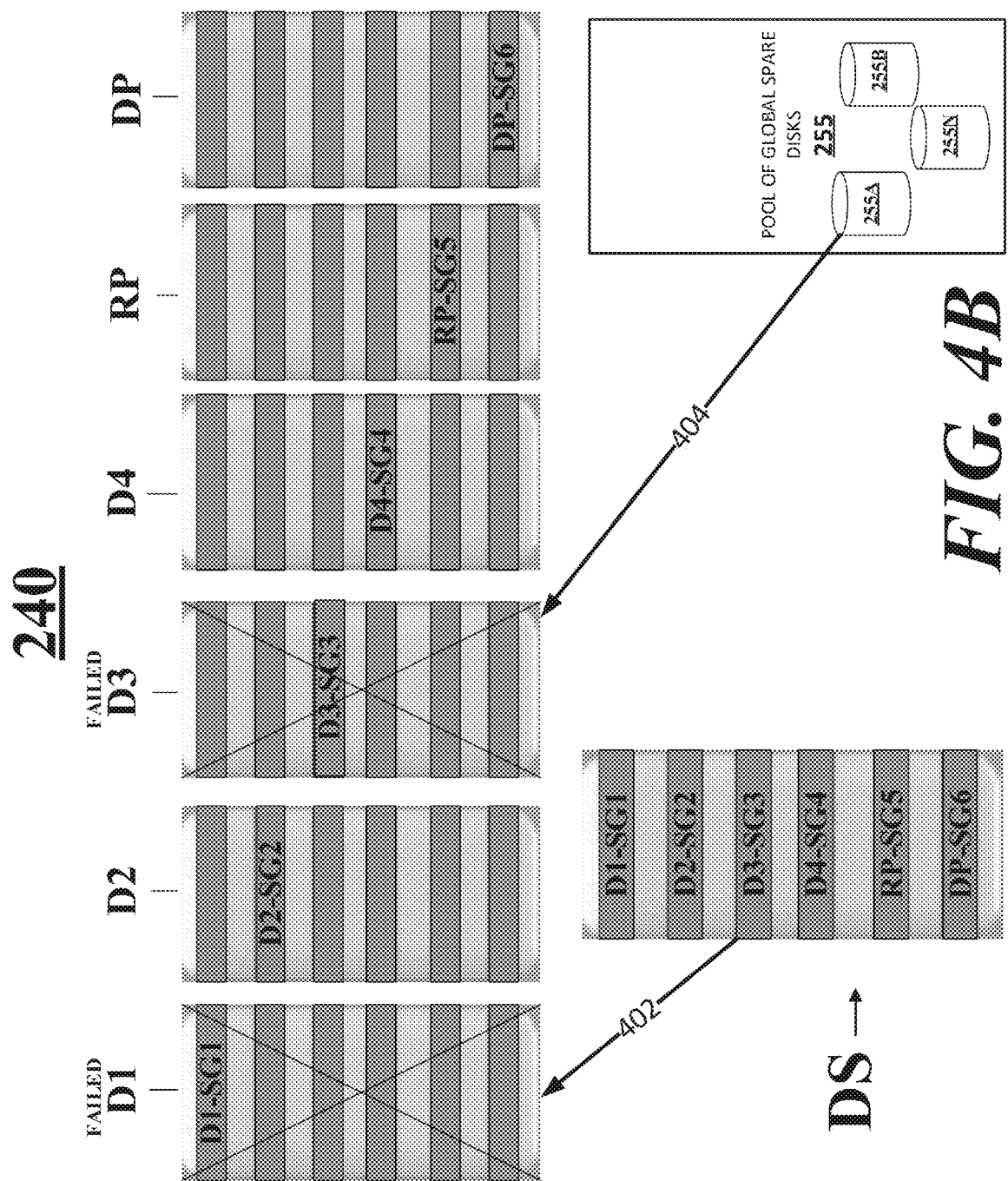
FIG. 4B illustrates a block diagram of a disk array using copied zone segments in the dedicated spare memory unit for reconstruction from a simultaneous failure of dual memory units in a memory unit group in accordance with FIG. 4A.

FIG. 4B illustrates a block diagram a disk array 240 using copied zone segments in the dedicated spare memory unit for reconstruction from a simultaneous failure of dual memory units in a memory unit group in accordance with FIG. 4A. Using FIG. 4B, assume disk D1 and disk D3 experience simultaneous disk failures. Disk DS is promoted (as indicated by arrow 402) to a first failed disk, such as disk D1. A spare disk 255A from a global hotspare pool of disks 255 is promoted (as indicated by arrow 404) to a second failed disk, such as disk D3. In one embodiment, the global hotspare pool of disks is a pool of dedicated spare disks, such as spare disks 255A, 255B, and 255N. Zone segments D1-SG1 and D3-SG3 from disk DS are retained in the newly promoted disk DS now acting as disk D1 (e.g., retain D1 [SG1,SG3]) by using a logical block address (LBA) segment locking. In other words, disk DS becomes replaces and becomes D1 and the previously copied zone segments in disk DS that correspond to the zone segments of the failed disks are retained in the disk DS. A zone segments D1-SG3 ("D1[SG3]") in the disk DS are copied to zone segments D3-SG3 ("D3[SG3]") in the newly promoted disk from the pool of global spare disks at block 560. The disk copy is allowed because of pre-copied zone segments of the dedicated spare disk DS prior to the dual disk failure and also because disk D3 is promoted from global hotspare pool of disks. Based on the XOR engines load, a throttle or schedule for a disk copy and the XOR operations of remaining segments is performed accordingly until a RAID Group, such as disk array 240, reaches an optimal state at block.

Figure 5A:
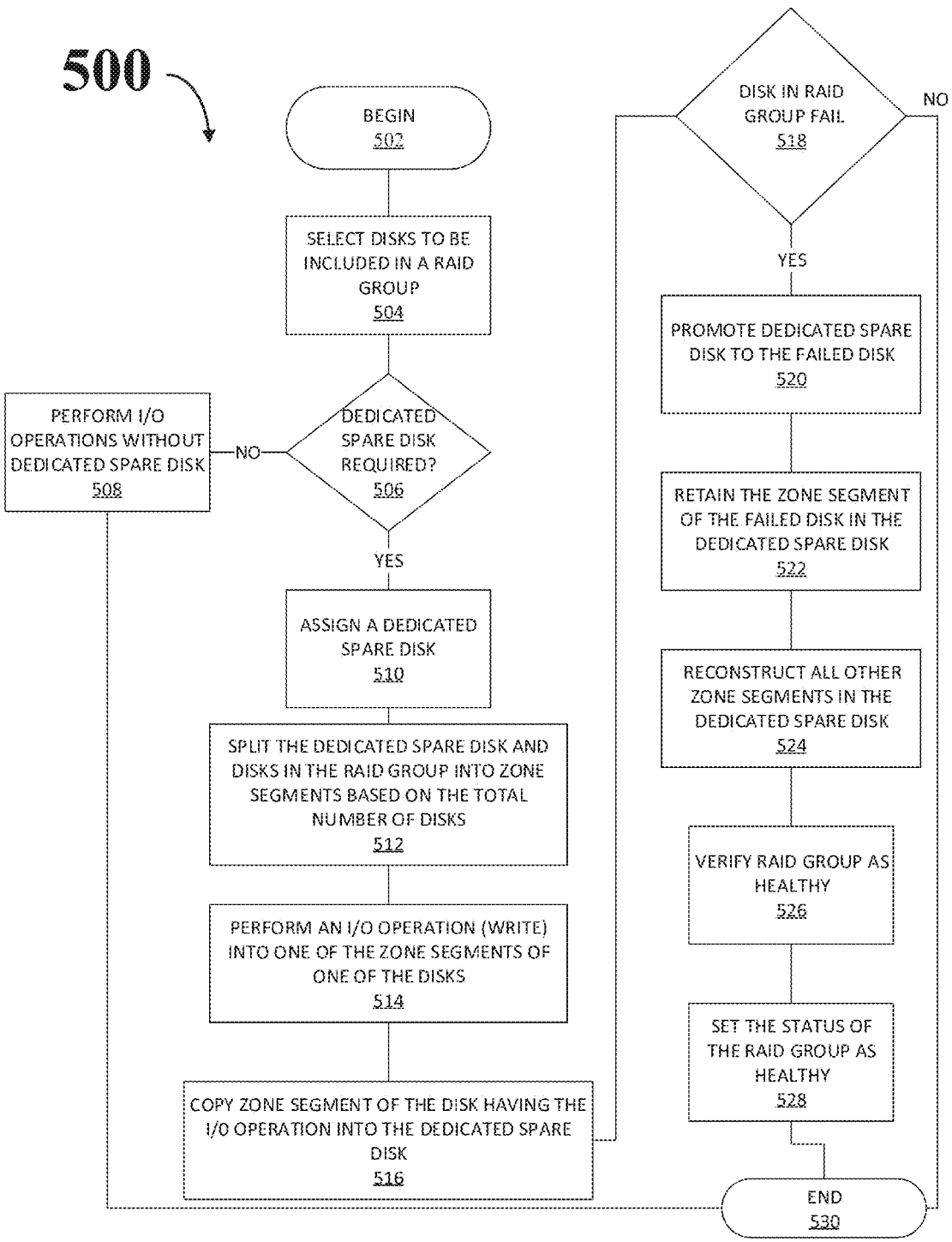
FIG. 5A illustrates an embodiment of a logic flow for reconstruction of a failed memory unit in a memory unit group using a dedicated spare in accordance with one embodiment.

FIG. 5A illustrates an embodiment of a logic flow 500 for reconstruction of a failed disk in a memory group using a dedicated spare in accordance with one embodiment. In the illustrated embodiment shown in FIG. 5, the logic flow 500 illustrates the logic flow that may be executed beginning with the creation of a memory group up until a first failure of a disk in the memory group. The logic flow 500 may begin at block 502. In some cases, the logic flow 500 may be initiated manually be an administrator of a computer system or automatically or dynamically by a storage system 220. In others, the logic flow 500 may be initiated programmatically as part of the storage operating system 300 (FIG. 2). The logic flow 500 then proceeds to block 504.

The logic flow 500 selects a number of disks to be included in a memory group at block 504. For example, disk 202, 204, 206 of disk arrays 240, 242, 244 may each have six total disks including parity disks. The logic flow 500 may determine whether the memory group requires a dedicated spare disk at block 506. Disks 202 of disk array 240 of FIG. 2 may require a dedicated spare disk, but disk 204 and 206 of memory groups 242 and 244 may not require the dedicated spare disk. If the RAID group does not require a dedicated spare disk, at block 508, input/output operations may be performed into the RAID group without the dedicated spare disk. From block 508, the logic flow 500 proceeds to block 530.

If the RAID group does implement a dedicated spare disk at block 506, the logic flow 500 proceeds to block 510. The logic flow 500 may assign a dedicated spare disk from a pool of global spare disks at block 510. The dedicated spare control disk module 285, operated by the processor 222, assigns the dedicated spare disk DS into the disk array 240. The logic flow 500 then proceeds to block 512.

The logic flow 500 splits the dedicated spare disk and also the disks in the RAID group into zone segments based on the total number of disks in the RAID group at block 512. The dedicated spare disk control module 285 splits the disks D1, D2, D3, D4, RP, and DP into zone segments D1-SG1, D2-SG2, D3-SG3, D4-SG4, RP-SG5, and DP-SG6. The storage system 220 determines the total number of the zone segments to be equal to a total number of disks in the RAID group. The total number of disks in the RAID group includes any parity disks assigned to the RAID group. The logic flow 500 then proceeds to block 514.

The logic flow 500 may perform input/output (I/O) operations, such as a write operation, into the zone segment of the disk for which the I/O operation is intended at block 514. In other words, a write operation may be performed in the zone segment of one of the disks D1, D2, D3, D4, RP, and DP in the disk array 240.

The logic flow 500 may mirror copy the zone segment of the disk having the I/O operation executed therein into the dedicated spare disk at block 516. The processor 222 and dedicated spare disk control module 285 begin copying the respective zone segments that receive write operations into the dedicated spare disk DS at the time the I/O is written to zone segment of the disk in the disk array 240. For example, if a write operation is performed in zone segments D1-SG1 of disk D1, the zone segment D1-SG1 of disk D1 is immediately copied into the corresponding zone segment D1-SG1 in the dedicated spare disk DS following the completion of the write operation. The logic flow 500 proceeds to block 518.

The logic flow 500 determines if any one of the disks in the RAID group has failed and/or is predicted to fail at block 518. If any one of the disks in the RAID group has not failed, the logic flow proceeds to block 530. Otherwise, the logic flow 500 proceeds to block 520.

The logic flow 500 promotes the dedicated spare disk to the failed disk at block 520. For example, if disk D1 has failed, the dedicated spare disk DS is promoted to the failed disk. In other words, the failed disk D1 is removed from the disk array 240 and the dedicated spare disk DS replaces the failed disk D1. Also, it should be noted that if any one of the disks in the RAID group is predicted to fail, a dedicated spare disk may be promoted to the predicted failed disk. All previously copied zone segments included in the dedicated spare disk relating to zone segments in the predicted failed memory unit are retained in the dedicated spare disk. The remaining segments in the predicted failed disk are copied into the dedicated spare disk.

The logic flow 500 then proceeds to block 522.

The logic flow 500 may retain the zone segment of the failed disk in the dedicated spare disk at block 522. For example, zone segment D1-SG1 of the failed disk D1 is retained in the dedicated spare disk DS and remains idle. The logic flow 500 reconstructs into the dedicated spare disk all other zone segments from the disks that did not fail in the RAID group at block 524. The disk zone segment reconstruction module 275 executes the reconstruction of zone segments D2-SG2, D3-SG3, D4-SG4, RP-SG5, and DP-SG6 from disks D2, D3, D4, RP, and DP in the dedicated spare disk DS following failure of disk D1. The logic flow 500 then proceeds to block 526. The logic flow 500 verifies if the RAID group is in a healthy state having no failed disks at block 526. The logic flow 500 sets the status of the RAID group as healthy at block 528. A notification is sent via the processor 222 and storage system operating system 300 in the storage system 220 that the RAID group as healthy and/or the status in the storage system 220 is set and updated as healthy via the processor 222 and storage system operating system 300. It should be noted that the logic flow 500 may also detect if a disk is predicted to fail. If a disk is predicted to fail, a dedicated spare disk is promoted to the predicted failed disk. All of the previously copied zone segments included in the dedicated spare relating to zone segments in the disk predicted to fail are retained in the dedicated spare. The remaining segments are copied back to the disk predicted to fail.

The logic flow 500 then ends at 530. The embodiments are not limited to this example.

Figure 5B:
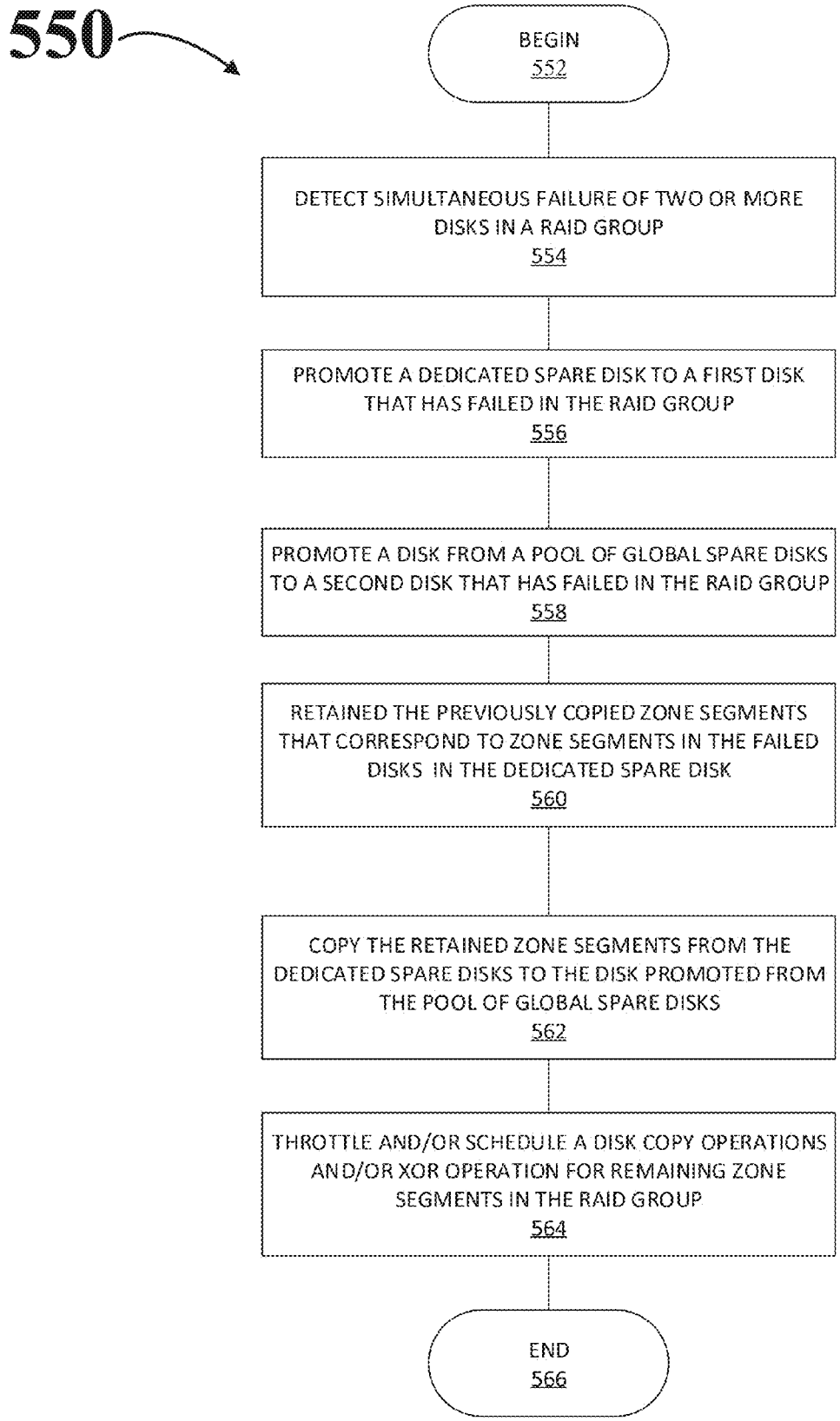
FIG. 5B illustrates an embodiment of a logic flow for reconstruction of a simultaneous failure of dual memory units in a memory unit group using a dedicated spare in association with FIGS. 4B and 5A.

FIG. 5B illustrates an embodiment of a logic flow for reconstruction of a simultaneous failure of dual memory units in a memory unit group using a dedicated spare in association with FIGS. 4B and 5A. FIG. 5B illustrates operations to recover from a dual disk failure scenario in a RAID group, such as if two (or more) disks fail simultaneously in the RAID group. In the illustrated embodiment shown in FIG. 5, the logic flow 550 illustrates the logic flow that may be executed beginning with the creation of a memory group up until a first failure of a disk in the memory group. The logic flow 500 may begin at block 552. In some cases, the logic flow 550 may be initiated manually be an administrator of a computer system or automatically or dynamically by a storage system 220. In others, the logic flow 550 may be initiated programmatically as part of the storage operating system 300 (FIG. 2). The logic flow 550 then proceeds to block 554.

Using FIG. 4B, assume disk D1 and disk D3 experience simultaneous failures. The logic flow 550 detects a simultaneous failure of two or more disks in a RAID group at block 554. The logic flow 550 promotes disk DS to a first failed disk, such as disk D1 at block 556. A disk from a global hotspare pool of disks is then promoted to a second failed disk, such as disk D3 at block 558. If there are more than two disk failures, the logic flow would promote "N" number of disks from the global hotspare pool of disks is then promoted to a "N" number of failed disk. In one embodiment, the global hotspare pool of disks is a pool of global dedicated spare disks. Zone segments D1-SG1 and D3-SG3 from disk DS are retained in disk D1 (e.g., retain D1 [SG1,SG3]) by using a logical block address (LBA) segment locking, since disk D1 is promoted from disk DS at block 560. In other words, disk DS becomes a new D1 and the previously copied zone segments in disk DS that correspond to the zone segments of the failed disks are retained in the disk DS. The logic flow 550 moves to block 562. The logic flow 550 executes a disk copy from zone segments D1-SG3 ("D1[SG3]") in the disk DS to zone segments D3-SG3 ("D3[SG3]") in the newly promoted disk from the pool of global spare disks at block 562. The disk copy is allowed because of pre-copied zone segments of the dedicated spare disk DS prior to the dual disk failure and also because disk D3 is promoted from global hotspare pool of disks. Based on the XOR engines load, a throttle or schedule for a disk copy and the XOR operations of remaining segments is performed accordingly until a RAID Group reaches an optimal state at block 564. The logic flow 550 ends at 566.

Figure 6:
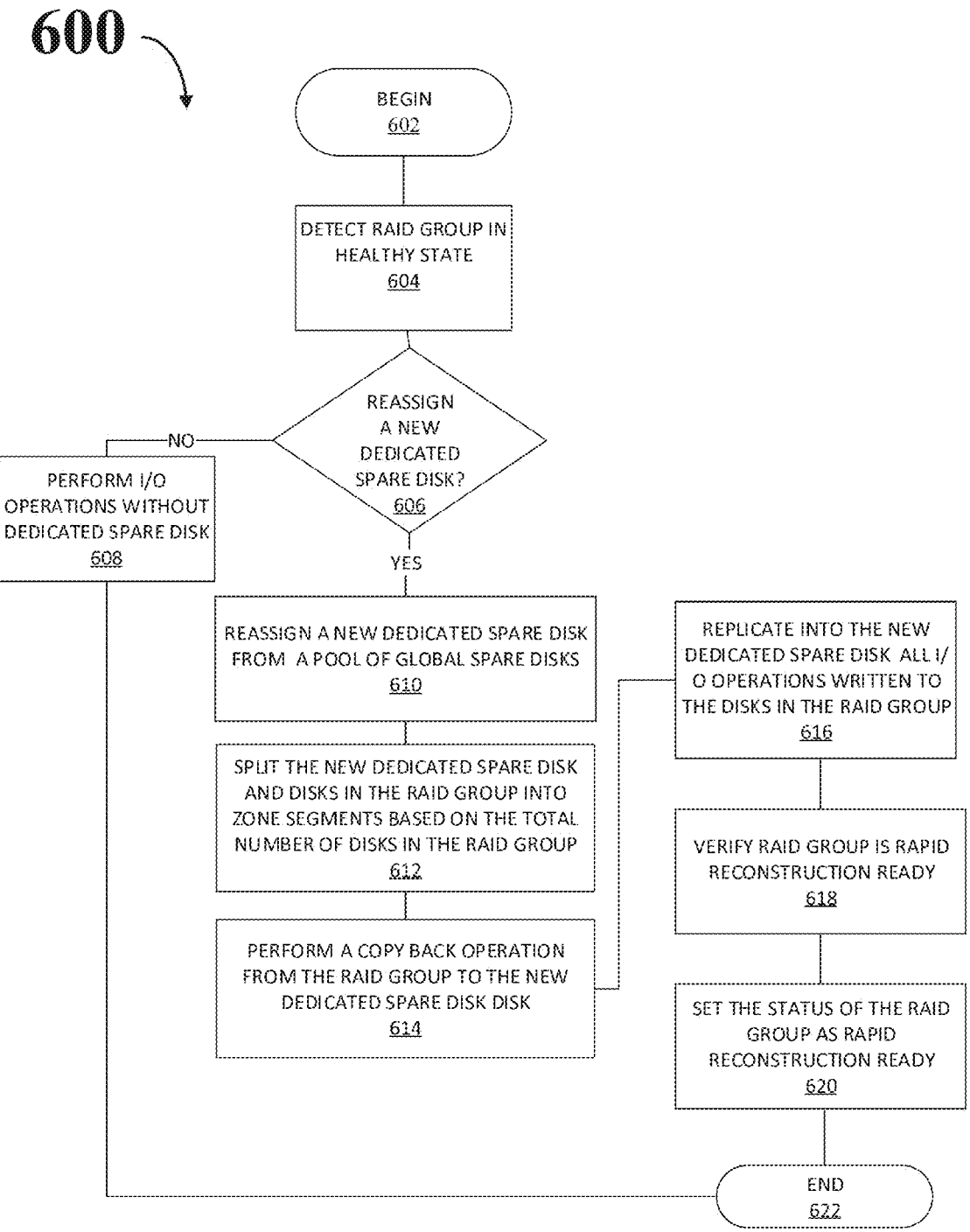
FIG. 6 illustrates an embodiment of a logic flow for reassigning a new dedicated spare memory unit after a memory unit failure in the memory unit group in accordance with one embodiment.

FIG. 6 illustrates an embodiment of a logic flow 600 for reassigning a new dedicated spare after failure of a disk in the RAID group in accordance with one embodiment.

In the illustrated embodiment shown in FIG. 6, the logic flow 600 illustrates the logic flow 600 that may be executed following a first failure of a disk in the RAID group and then reassigning a new dedicated spare disk. The logic flow 600 may begin at block 602. In some cases, the logic flow 600 may be initiated manually be an administrator of a computer system or automatically/dynamically by a storage system 220. Also, the logic flow 600 may be initiated programmatically as part of the storage operating system 300 (FIG. 2). The logic flow 600 then proceeds to block 604.

The logic flow 600 detects the RAID group is in a healthy state at block 604. For example disks D1, D2, D3, D4, RP, and DP of disk array 240 may have a status set as sick and/or healthy. Logic flow 600 at block 604 may be executed following one of the blocks of FIG. 5. For example, logic flow 600 may follow after the logic flow 500 at block 518 where a disk in the RAID group is predicted to fail or has failed. The logic flow 600 may determine whether the RAID group requires a new dedicated spare disk to be reassigned from a pool of global spare disks to the RAID group at block 606. For example, as illustrated in FIG. 5, the dedicated spare disk DS replaces the failed disk D1 and is promoted to be the new disk D1. At this point, a new dedicated spare disk may be needed in the RAID group. If the RAID group does not require a dedicated spare disk to be reassigned, at block 608, any input/output operations may be performed in the RAID group without the dedicated spare. The logic flow 600 proceeds from block 608 to block 622. Also, it should be noted that if any one of the disks in the RAID group is predicted to fail, a dedicated spare disk may be promoted to the predicted failed disk. All previously copied zone segments included in the dedicated spare disk relating to zone segments in the predicted failed memory unit are retained in the dedicated spare disk. The remaining segments in the predicted failed disk are copied into the dedicated spare disk.

If the RAID group does require a reassignment of a new dedicated spare disk from the pool of dedicated spare disks, the logic flow 600 proceeds to block 610. The logic flow 600 may reassign a new dedicated spare disk from a pool of global spare disks at block 610. The dedicated spare control module 285, operated by the processor 222, reassigns a new dedicated spare disk DS into the disk array 240 from the pool of global spare disks 255 (FIG. 2). The logic flow 600 then proceeds to block 612.

The logic flow 600 splits the new dedicated spare disk and also the disks in the RAID group into zone segments based on the total number of disks in the RAID group at block 612. In one embodiment, the total number of disks in the RAID group does not include the dedicated spare disk. The dedicated spare disk control module 285 splits the disks D1, D2, D3, D4, RP, and DP into zone segments D1-SG1, D2-SG2, D3-SG3, D4-SG4, RP-SG5, and DP-SG6. The storage system 220 determines the total number of the zone segments D1-SG1, D2-SG2, D3-SG3, D4-SG4, RP-SG5, and DP-SG6 to be equal to a total number of disks in the RAID group D1, D2, D3, D4, RP, and DP. The total number of disks in the RAID group includes any parity disks assigned to the RAID group. The logic flow 600 then proceeds to block 614.

The logic flow 600 may perform a mirror copy back up operation for any and all write operations into the zone segments of the disks for which the I/O operations are intended in the RAID group at block 614. In other words, a new mirror copy backup operation is performed from the zone segments in the RAID group into the new dedicated spare disk. The logic flow 600 replicates the zone segment of the disk into the corresponding zone segment of the new dedicated spare disk upon receiving any new I/O operation executed in the zone segment of the disk at block 616. The processor 222 and dedicated spare disk control module 285 begin copying the respective zone segments that receive I/O operations to the dedicated spare disk DS at the time the new I/O is written to zone segment of the disk in the disk array 240. For example, if a write operation is performed in zone segments D1-SG1 of disk D, the zone segments D1-SG1 of disk D1 is immediately copied into the corresponding zone segments D1-SG1 in the newly reassigned dedicated spared disk DS following the completion of the write operation. The logic flow 600 proceeds to block 618.

The logic flow 600 verifies if the RAID group is rapid reconstruction ready at block 618. The logic flow 600 sets the status of the RAID group as rapid reconstruction ready at block 620. A notification is sent via the processor 222 and storage system operating system 300 to the storage system 220 and the client 160 that the RAID group as healthy and/or the status in the storage system 220 is set and updated as healthy via the processor 222 and storage system operating system 300. The logic flow then ends at 622. The embodiments are not limited to this example.

Figure 7:
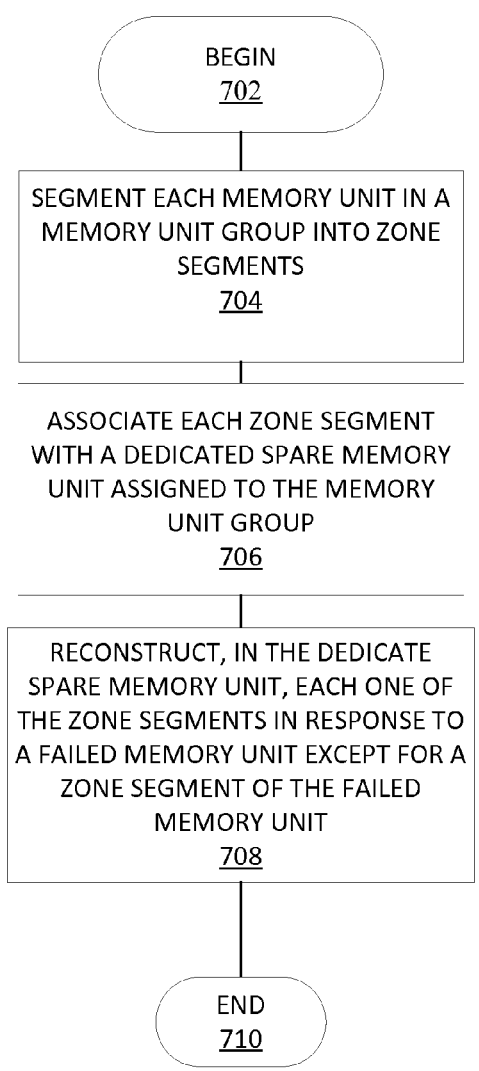
FIG. 7 illustrates an embodiment of a logic flow for increasing reconstruction time of a failed memory unit using a dedicated spare memory unit in accordance with one embodiment.

FIG. 7 illustrates an embodiment of a logic flow for increasing reconstruction time of a failed disk using a dedicated spare in accordance with one embodiment. In the illustrated embodiment shown in FIG. 7, the logic flow 600 may begin at block 702. In some cases, the logic flow 700 may be initiated manually be an administrator of a computer system or automatically/dynamically by a storage system 220. Also, the logic flow 700 may be initiated programmatically as part of the storage operating system 300 (FIG. 2). The logic flow 700 then proceeds to block 704. The logic flow 700 creates zone segments by segmenting each memory unit in a memory unit group at block 704. The number of zone segments in the memory unit group is based on the total number of memory unit including all data memory unit and parity memory unit protecting the data memory unit) in the memory unit group. The logic flow 700 associates the zone segments of the memory unit in the memory unit group with a dedicated spare memory unit assigned to the memory unit group at block 706. The dedicated spare memory unit is split up into the zone segments of the memory unit group for associating the zone segments with the dedicated spare memory unit. The logic flow 700 reconstructs, in the dedicated spare memory unit, each one of the zone segments from the memory units in the memory unit group that have not failed or have not been predicted to fail except for the failed zone segment from the failed memory unit that corresponds in the dedicated spare memory unit at block 708. The logic flow then ends at block 710.

Figure 8:
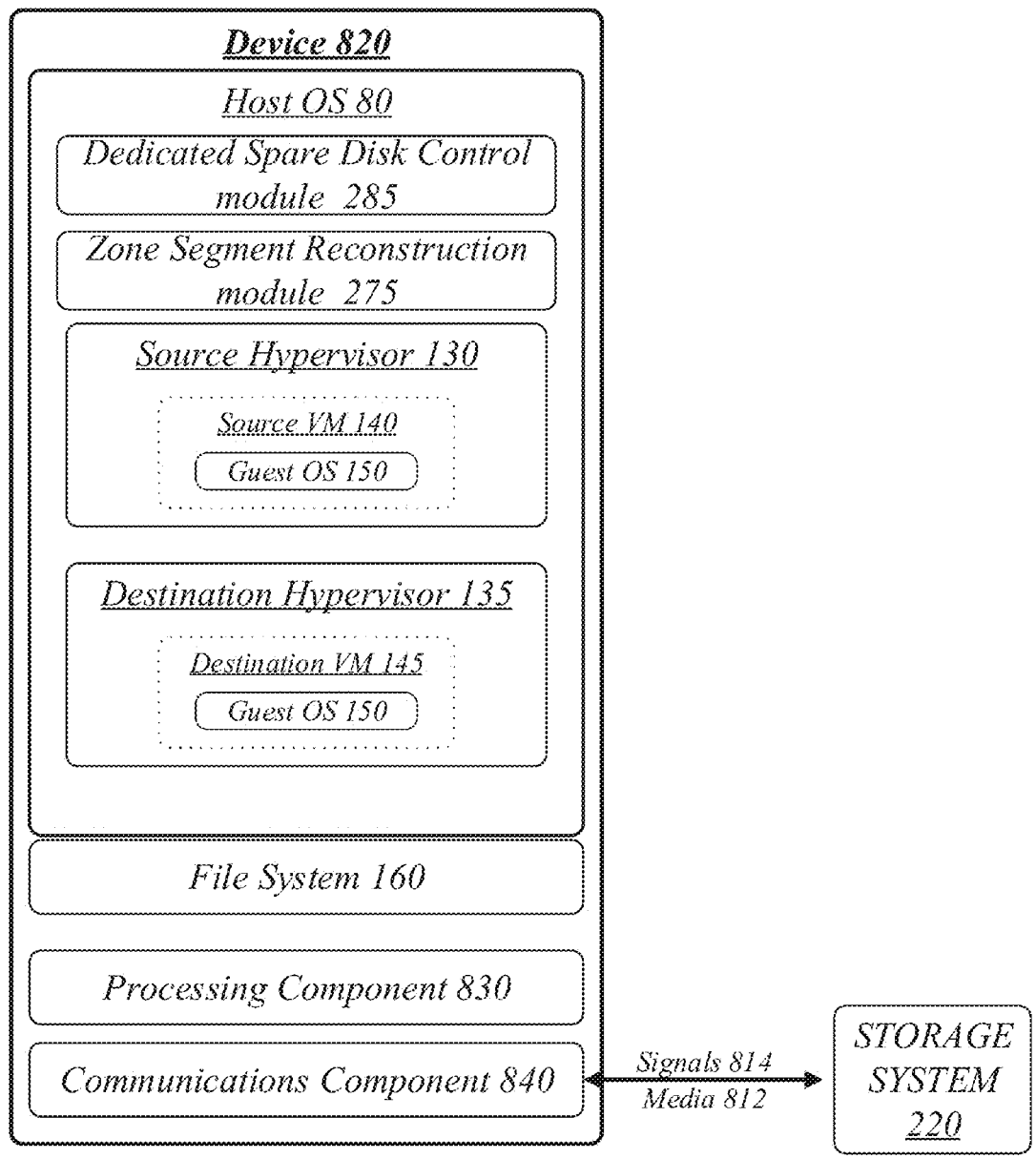
FIG. 8 illustrates an embodiment using a centralized system for increasing reconstruction time of a failed memory unit using a dedicated spare memory unit.

FIG. 8 illustrates a block diagram of a centralized system 800. The centralized system 800 (may be a virtual machine system) may implement some or all of the structure and/or operations for increased efficiency of reconstruction of disk zone segments in a RAID group using a dedicated spare disk in a single computing entity, such as entirely within device 820 in association with storage system 220. Thus, the embodiments described in FIG. 8, work in conjunction with all other embodiments described in FIGS. 2-7.

The device 820 may also comprise any electronic device capable of receiving, processing, and sending information for the centralized system 800. Examples of an electronic device may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The storage system 220 may execute processing operations or logic for the system 800 using a processing component 830. The processing component 830 may comprise various hardware elements, software elements, or a combination of both. Examples of hardware elements may include devices, logic devices, components, processors, microprocessors, circuits, processor circuits, circuit elements, such as transistors, resistors, capacitors, inductors, integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 820 may execute communications operations or logic for the system 800 using communications component 840 in association with storage system 220. The communications component 840 may implement any well-known communications techniques and protocols, such as techniques suitable for use with packet-switched networks, such as public networks such as the Internet, private networks such as an enterprise intranet, circuit-switched networks, such as the public switched telephone network, or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 812 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 820 may communicate with the storage system 220 over a communications media 812 using communications signals 814 via the communications component 840. The device 810 may be internal or external to the storage system 220 as desired for a given implementation.

The device 820 may host the host OS 80, the host 80 running the zone segment reconstruction module 275, the dedicated spare disk control module 285, source hypervisor 130, and destination hypervisor 135, with the source VM 140 and destination VM 145 provided by the respective hypervisors 130, 135. Thus, device 820 and storage system 220, along with VM 140 and 145, a virtual RAID group may be created and employ the logic and methodologies described in the embodiments herein. The storage system 220 may also host the file system 160 storing the virtual disk blocks 190 for the source VM virtual Disk 170 and destination VM virtual Disk 175. The zone segment reconstruction module 275 and the dedicated spare disk control module 285 may perform the zone segment reconstruction and assignment of a dedicated spare disk to a RAID group in a virtual machine environment using a guest OS 150 from the source VM 140 to the destination VM 145 on the device 820.

The storage system 220 may provide support or control for the zone segment reconstruction using the zone segment reconstruction module 275, operations involving the dedicated spare disk using the dedicated spare disk control module 285, and/or the hosting operations of the storage system 220 and host 80. The storage system 220 may comprise an external device externally controlling the device 820, such as where storage system 220 is a server device hosting the guest OS 150 and the device 820 is a client administrator device used to administrate storage system 220 and initiate the zone segment reconstruction module 275 and/or the dedicated spare disk control module 285. In some of these cases, the zone segment reconstruction module 275 and/or the dedicated spare disk control module 285 may instead be hosted on the storage system 220 with the remainder of the virtual machine system 800 hosted on device 820. Alternatively, the storage system 220 may have hosted the zone segment reconstruction module 275 or the dedicated spare disk control module 285 as a distribution repository, with the zone segment reconstruction module 275 or the dedicated spare disk control module 285 downloaded to the storage system 220 from the device 820.

Figure 9:
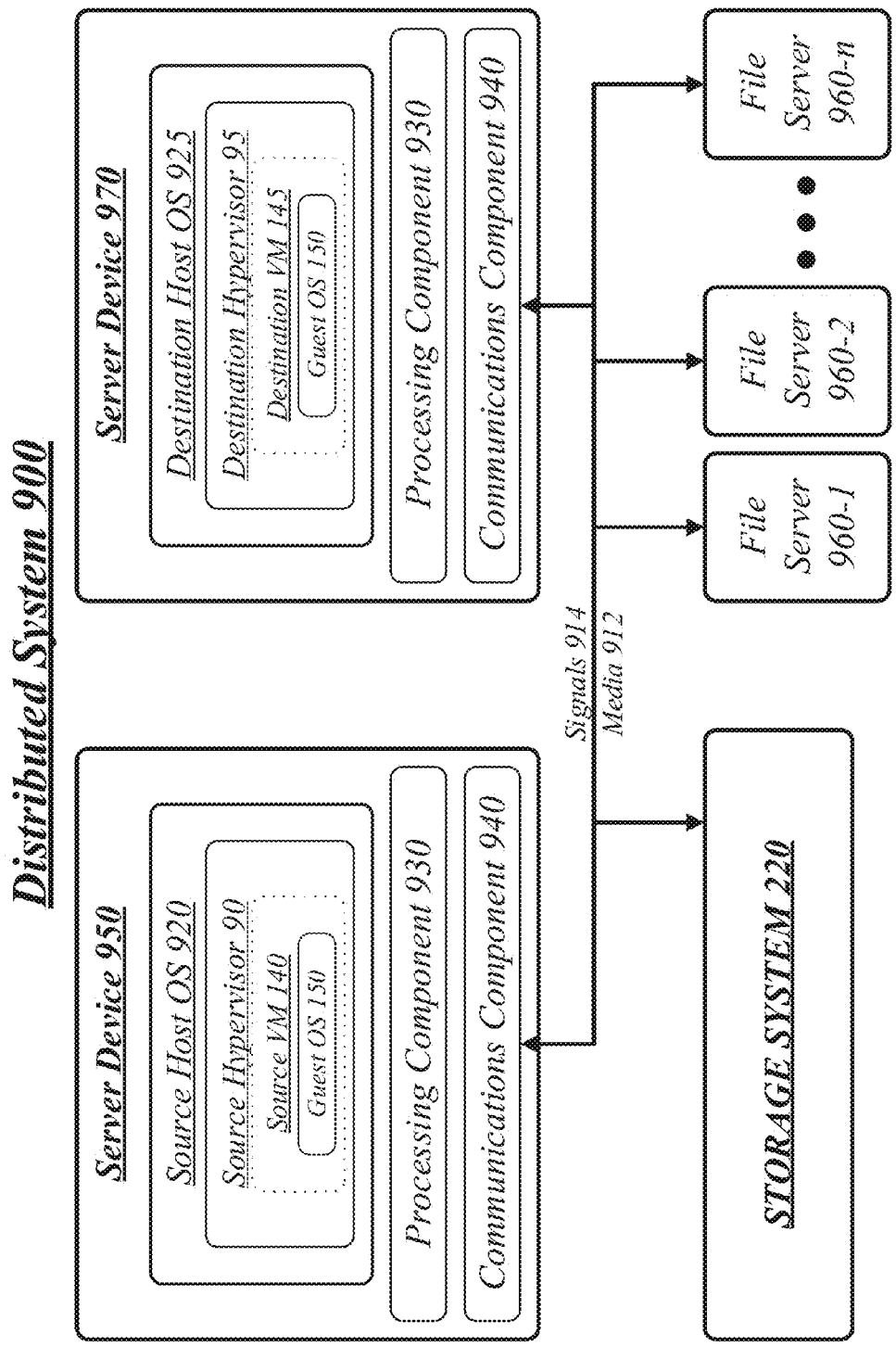
FIG. 9 illustrates an embodiment using a distributed system for increasing reconstruction time of a failed memory unit using a dedicated spare memory unit.

FIG. 9 illustrates a block diagram of a distributed system 900. The distributed system 900 may distribute portions of the structure and/or operations for the increased efficiency of reconstruction of disk segments using a dedicated spare disk across multiple computing entities. Thus, distributed system 900 may create a virtual RAID group using the logic and methodologies described in the embodiments herein. The Examples of distributed system 900 may include without limitation a client-server architecture, a 3-tier architecture, an N-tier architecture, a tightly-coupled or clustered architecture, a peer-to-peer architecture, a master-slave architecture, a shared database architecture, and other types of distributed systems. As such, the storage system 220 of FIG. 3 may be multiple storage systems distributed across a virtual system 900 for executing cloud computing. For example, a virtual disks distributed across the virtual system may be assigned together to form a RAID group using cloud computing technology. The embodiments are not limited in this context.

The distributed system 900 may comprise a storage system (e.g., FIG. 2 220) and server devices 950 and 970. In general, the storage system 220 and the server devices 950 and 970 may be the same or similar to the storage system 220 and device 820 as described with reference to FIG. 8. For instance, the storage system 220 and the server devices 950 and 970 may each comprise a processing component 930 and a communications component 940 which are the same or similar to the processing component 830 and the communications component 840, respectively, as described with reference to FIG. 8. In another example, the devices 220, 950, and 970 may communicate over a communications media 912 using communications signals 914 via the communications components 940. The distributed system 900 may comprise a distributed file system implemented by distributed file servers 960 including file servers 960-1 through 960-n, where the value of n may vary in different embodiments and implementations. The storage system 220 and server devices 950, 970 may work in conjunction with the file servers 960 in the operation of the distributed file system, such as by providing a local cache for the distributed file system primarily hosted on the file servers 960 so as to reduce latency and network bandwidth usage for the storage system 220 and server devices 950, 970.

The storage system 220 may comprise or employ one or more client programs that operate to perform various methodologies in accordance with the described embodiments. In one embodiment, for example, the storage system 220 may implement the zone segment reconstruction module 275 (FIG. 2) and the dedicated spare disk control module 285 for executing the logic flow and methodologies described herein of FIG. 3-7 in association with the guest OS 150 from the source VM 140 to the destination VM 145. The storage system 220 may use signals 914 to interact with the source hypervisor 90, destination hypervisor 95 and/or guest OS 150 while they are running on each of the source VM 140 and destination VM 145, and file servers 960.

The server devices 950, 970 may comprise or employ one or more server programs that operate to perform various methodologies in accordance with the described embodiments. In one embodiment, for example, the server device 950 may implement a source host OS 920 hosting the source hypervisor 90 providing the source VM 140. The server device 950 may use signals 914 to receive control signals from the zone segment reconstruction module 275 or the dedicated spare disk control module 285 on the storage system 220 and to transmit configuration and status information to the zone segment reconstruction module 275 or the dedicated spare disk control module 285. The server device 950 may use signals 914 communicate with the file servers 960 both for the providing of source VM 140 and for the communication of guest OS 150 from the source VM 140 to the destination VM 145.

The server device 970 may implement a destination host OS 925 hosting the destination hypervisor 95 providing the destination VM 145. The server device 970 may use signals 914 to receive control signals from the zone segment reconstruction module 275 or the dedicated spare disk control module 285 on the storage system 220 and to transmit configuration and status information to the zone segment reconstruction module 275 or the dedicated spare disk control module 285 on the storage system 220. The server device 970 may use signals 914 communicate with the file servers 960 both for the providing of destination VM 145 and for the communication of guest OS 150 to the destination VM 145 to the source VM 140. Thus, the storage device 220 along with VM 140 and 145, may create a virtual RAID group, create zone segments in each of the virtual disks in the RAID group, and assign a virtual dedicated spare disk from a pool of virtual dedicated spare disk, and employ the logic and methodologies described in the embodiments herein. Thus, depending on the computing architecture, the embodiments embodiment herein may be in a physical RAID group environment and/or a virtual RAID group environment.

In some embodiments, the same server device may implement both the source hypervisor 90 and the destination hypervisor 95. In these embodiments, the zone segment reconstruction module 275 or the dedicated spare disk control module 285 on the storage system 220 may perform the zone segment operations or dedicated spare disk operations, as described herein, using the guest OS 150 from the source VM 140 to the destination VM 145, in conjunction with operations described herein using the distributed file system.

Figure 10:
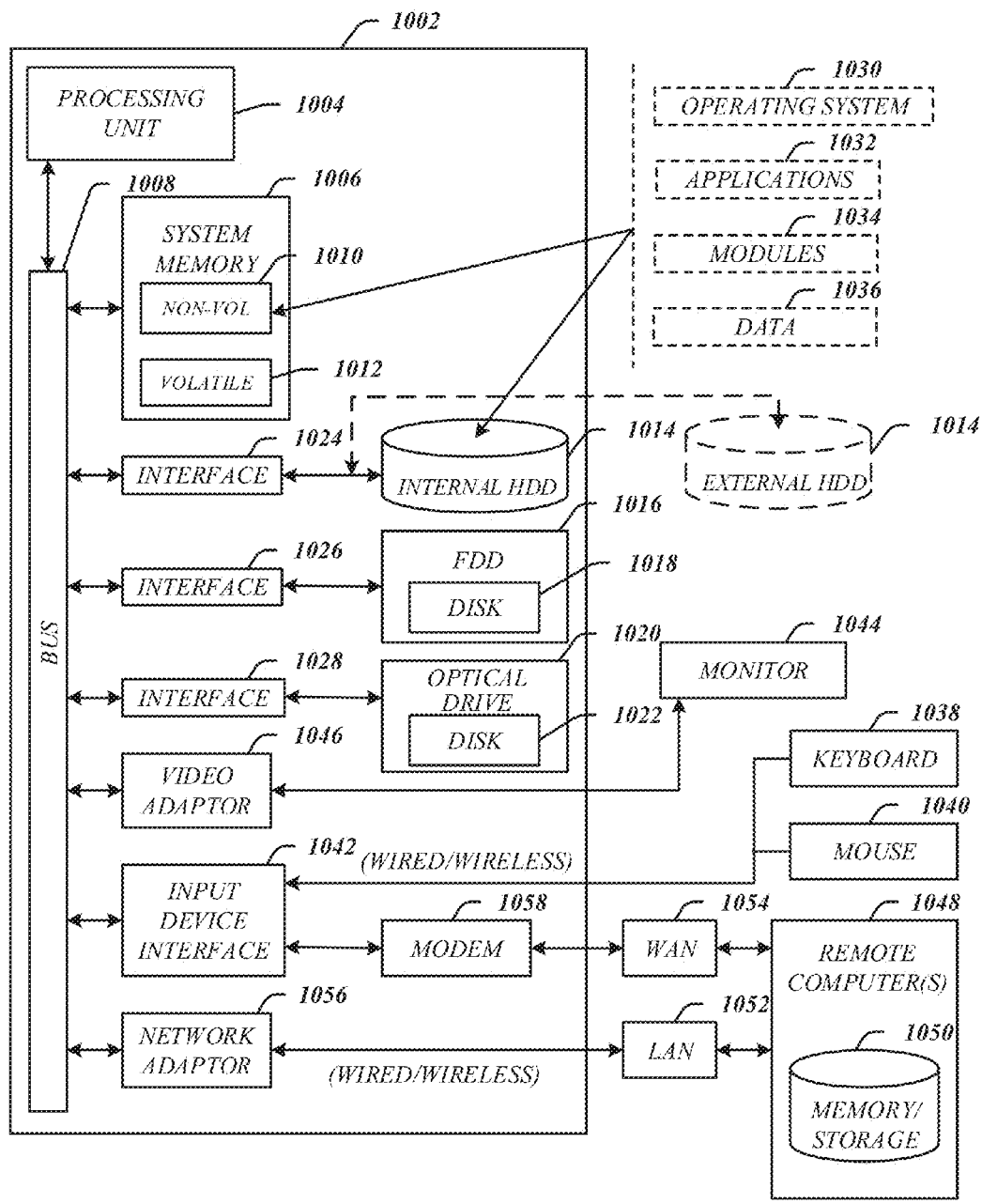
FIG. 10 illustrates an embodiment of a computing architecture.

FIG. 10 illustrates an embodiment of an exemplary computing architecture 1000 suitable for implementing various embodiments as previously described. In one embodiment, the computing architecture 1000 may comprise or be implemented as part of an electronic device. Examples of an electronic device may include those described with reference to FIGS. 8 and 9, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components/modules can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1004.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture or operation. An article of manufacture may comprise a non-transitory computer-readable storage medium to store logic. Examples of a non-transitory computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices, such as a USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic Disk 1018, and an optical disk drive 1020 to read from or write to a removable optical Disk 1022, such as, for example, a CD-ROM or DVD. The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1094 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of the system 100.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens, trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1094 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication. This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
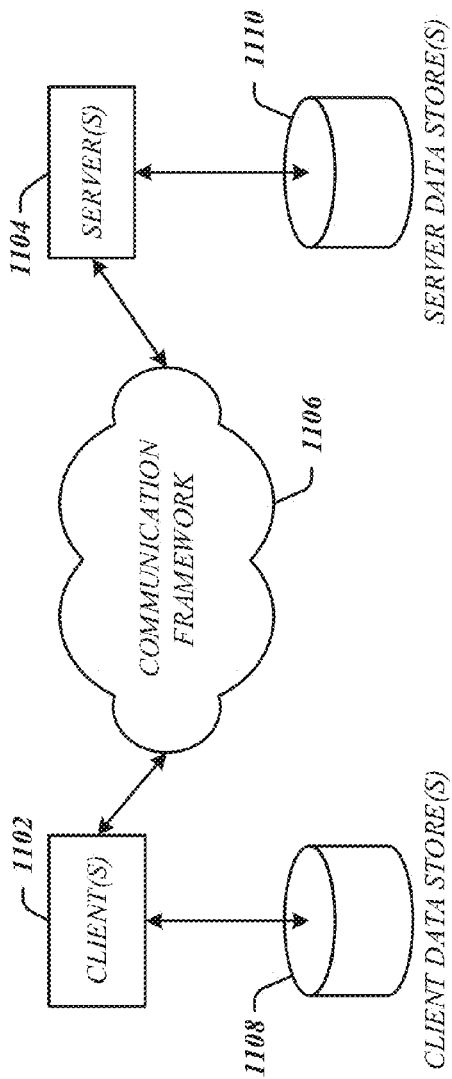
FIG. 11 illustrates an embodiment of a communications architecture.

FIG. 11 illustrates a block diagram of an exemplary communications architecture 1100 suitable for implementing various embodiments as previously described. The communications architecture 1500 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 comprises includes one or more clients 1102 and servers 1104. The clients 1102 may implement a client device (not shown) on the storage system 220. The servers 1104 may implement the server device 905, 970 shown in FIG. 9. The clients 1102 and the servers 1104 are operatively connected to one or more respective client data stores 1108 and server data stores 1110 that can be employed to store information local to the respective clients 1102 and servers 1104, such as cookies and/or associated contextual information.

The clients 1102 and the servers 1104 may communicate information between each other using a communication framework 1106. The communications framework 1106 may implement any well-known communications techniques and protocols. The communications framework 1106 may be implemented as a packet-switched network, such as public networks such as the Internet, private networks such as an enterprise intranet, and so forth, a circuit-switched network, or a combination of a packet-switched network and a circuit-switched network with suitable gateways and translators.

The communications framework 1106 may implement various network interfaces arranged to accept, communicate, and connect to a communications network. A network interface may be regarded as a specialized form of an input output interface. Network interfaces may employ connection protocols including without limitation direct connect, Ethernet, such as, for example, thick, thin, twisted pair 10/100/1000 Base T, and the like, token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network, such as an enterprise intranet, a public network, the Internet, a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method, comprising:
    segmenting a first memory unit, a second memory unit, and a third memory unit of a memory unit group into a plurality of zone segments;
    associating the plurality of zone segments with a dedicated spare memory unit assigned to the memory unit group;
    retaining, in the dedicated spare memory unit, a first failed zone segment of the first memory unit having failed and a second failed zone segment of the second memory unit having failed;
    reconstructing, in the dedicated spare memory unit, a third zone segment of the third memory unit;
    promoting the dedicated spare memory unit as a first replacement memory unit for the first memory unit;
    assigning a spare memory unit as a second replacement memory unit for the second memory unit; and
    copying the second failed zone segment of the second memory unit from the first replacement memory unit to the second replacement memory unit.

2. The method of claim 1, comprising:
    reconstructing, in the second replacement memory unit, remaining zone segments in response to the first memory unit and the second memory unit failing.

3. The method of claim 1, comprising:
    responsive to a prediction that the first memory unit will fail:
        promoting the dedicated spare memory unit as the first replacement memory unit for the first memory unit;
        retaining zone segments, in the first replacement memory unit, that relate to zone segments within the first memory unit predicted to fail; and
        copying remaining zone segments in the first memory unit to the first replacement memory unit.

4. The method of claim 1, wherein the retaining comprises:
    utilizing a logical block address segment lock to retain the first failed zone segment and the second failed zone segment.

5. The method of claim 1, wherein the assigning a spare memory unit comprises:
    promoting the spare memory unit from a pool of global spare memory units.

6. The method of claim 1, comprising:
    responsive to the first replacement memory unit replacing the first memory unit and the second replacement memory unit replacing the second memory unit:
        reassigning a second spare memory unit from a pool of global spare memory units as a new dedicated spare memory unit;
        segmenting the first replacement memory unit, the second replacement memory unit, and the third memory unit into a new plurality of zone segments; and
        associating the new plurality of zone segments with the new dedicated spare memory unit.

7. The method of claim 1, comprising performing a mirror copy into the dedicated spare memory unit for a write operation into one of the plurality of zone segments.

8. The method of claim 1, comprising:
    specifying that a total number of the plurality of zone segments is to equal a total number of memory units in the memory unit group, the total number of memory units in the memory unit group comprising one or more parity memory units assigned to the memory unit group; and
    specifying that a size of each of the plurality of zone segments is to equal a size of a memory unit divided by the total number of memory units in the memory unit group.

9. A computing device, comprising:
    a memory having stored thereon instructions for performing a method; and
    a processor coupled to the memory, the processor configured to execute the instructions to cause the processor to:
        segment a first memory unit, a second memory unit, and a third memory unit of a memory unit group into a plurality of zone segments;
        associate the plurality of zone segments with a dedicated spare memory unit;
        retain, in the dedicated spare memory unit, a first failed zone segment of the first memory unit having failed and a second failed zone segment of the second memory unit having failed;
        reconstruct, in the dedicated spare memory unit, a third zone segment of the third memory unit;
        promote the dedicated spare memory unit as a first replacement memory unit for the first memory unit;
        assign a spare memory unit as a second replacement memory unit for the second memory unit; and
        copy the second failed zone segment of the second memory unit from the first replacement memory unit to the second replacement memory unit.

10. The computing device of claim 9, wherein the instructions cause the processor to:
    reconstruct, in the second replacement memory unit, remaining zone segments.

11. The computing device of claim 9, wherein the instructions cause the processor to:
    responsive to the first replacement memory unit replacing the first memory unit and the second replacement memory unit replacing the second memory unit:

reassign a second spare memory unit from a pool of global spare memory units as a new dedicated spare memory unit;

segment the first replacement memory unit, the second replacement memory unit, and the third memory unit into a new plurality of zone segments; and associate the new plurality of zone segments with the new dedicated spare memory unit.

12. The computing device of claim 9, wherein the instructions cause the processor to:

copy the plurality of zone segments into the dedicated spare memory unit when the dedicated spare memory unit is first assigned to the memory unit group.

13. The computing device of claim 9, wherein the instructions cause the processor to:

perform a mirror copy into the dedicated spare memory unit.

14. The computing device of claim 9, wherein the instructions cause the processor to:

specify that a total number of the plurality of zone segments is to equal a total number of memory units in the memory unit group, the total number of memory units in the memory unit group comprising one or more parity memory units assigned to the memory unit group.

15. A non-transitory computer-readable storage medium comprising instructions that, when executed, cause a processor to:

segment a first memory unit, a second memory unit, and a third memory unit of a memory unit group into a plurality of zone segments;

associate the plurality of zone segments with a dedicated spare memory unit;

retain, in the dedicated spare memory unit, a first failed zone segment of the first memory unit having failed and a second failed zone segment of the second memory unit having failed;

reconstruct, in the dedicated spare memory unit, a third zone segment of the third memory unit;

promote the dedicated spare memory unit as a first replacement memory unit for the first memory unit;

assign a spare memory unit as a second replacement memory unit for the second memory unit; and copy the second failed zone segment of the second memory unit from the first replacement memory unit to the second replacement memory unit.

16. The computer-readable storage medium of claim 15, comprising further instructions that, when executed, cause the processor to:

responsive to the first replacement memory unit replacing the first memory unit and the second replacement memory unit replacing the second memory unit:

reassign a second spare memory unit from a pool of global spare memory units as a new dedicated spare memory unit;

segment the first replacement memory unit, the second replacement memory unit, and the third memory unit into a new plurality of zone segments; and associate the new plurality of zone segments with the new dedicated spare memory unit.

17. The computer-readable storage medium of claim 15, comprising further instructions that, when executed, cause the processor to:

promote the spare memory unit from a pool of global spare memory units.

18. The computer-readable storage medium of claim 15, comprising further instructions that, when executed, cause the processor to copy the plurality of zone segments into the dedicated spare memory unit.

19. The computer-readable storage medium of claim 15, comprising further instructions that, when executed, cause the processor to perform a mirror copy into the dedicated spare memory unit.

20. The computer-readable storage medium of claim 15, comprising further instructions that, when executed, cause the processor to:

define a total number of the plurality of zone segments; and define a size of each of the plurality of zone segments.

* * * * *